(12) United States Patent
Lee

(10) Patent No.: US 7,852,528 B2
(45) Date of Patent: Dec. 14, 2010

(54) IMAGE READING APPARATUS INCLUDING AUTO DOCUMENT FEEDER

(75) Inventor: Min-chul Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1059 days.

(21) Appl. No.: 11/601,637

(22) Filed: Nov. 20, 2006

(65) Prior Publication Data

US 2007/0146828 A1 Jun. 28, 2007

(30) Foreign Application Priority Data

Dec. 23, 2005 (KR) .................. 10-2005-0128702

(51) Int. Cl.
*H04N 1/04* (2006.01)
(52) U.S. Cl. ............... 358/498; 358/496; 358/474; 358/501; 271/186; 271/114; 399/367
(58) Field of Classification Search .......... 358/474, 358/498, 497, 496, 501, 505; 271/186, 114, 271/9.07, 9.08; 399/367
See application file for complete search history.

(56) References Cited

U.S. PATENT DOCUMENTS

| | | | | |
|---|---|---|---|---|
| 4,762,994 A | * | 8/1988 | Byerly et al. | 250/236 |
| 6,229,139 B1 | * | 5/2001 | Neukermans et al. | 250/236 |
| 7,495,811 B2 | * | 2/2009 | Soda | 358/474 |
| 7,556,255 B2 | * | 7/2009 | Terashima et al. | 271/9.07 |
| 7,668,482 B2 | * | 2/2010 | Ushikubo | 399/123 |
| 2003/0042668 A1 | * | 3/2003 | Takamatsu | 271/186 |
| 2004/0207887 A1 | * | 10/2004 | Makino et al. | 358/496 |
| 2009/0316222 A1 | * | 12/2009 | Oshida et al. | 358/474 |

FOREIGN PATENT DOCUMENTS

| | | |
|---|---|---|
| CN | 2555257 Y | 6/2003 |
| JP | 5-91243 | 4/1993 |
| JP | 9-18675 | 1/1997 |
| JP | 2002-189319 | 7/2002 |
| JP | 2005-84551 | 3/2005 |

OTHER PUBLICATIONS

Office Action issued in Chinese Patent Application No. 2006101711364 on Apr. 11, 2008.

* cited by examiner

*Primary Examiner*—Negussie Worku
(74) *Attorney, Agent, or Firm*—Staas & Halsey LLP

(57) ABSTRACT

Provided is an image reading apparatus including a scanning unit having a flat glass plane and a scanning module, and an auto document feeder (ADF) having a contact member. The contact member has a body unit that faces the scanning unit while interposing the flat glass plane therebetween and biases the document toward the flat glass plane, and a plurality of elastic ribs that elastically bias the body unit toward the flat glass plane and which are integrally formed with the body unit.

23 Claims, 7 Drawing Sheets

IMAGE READING APPARATUS INCLUDING AUTO DOCUMENT FEEDER

CROSS-REFERENCE TO RELATED APPLICATION

This application claims the benefit of Korean Patent Application No. 2005-128702, filed on Dec. 23, 2005 in the Korean Intellectual Property Office, the disclosure of which is incorporated herein in its entirety by reference.

BACKGROUND OF THE INVENTION

1. Field of the Invention

An aspect of the present invention relates to an image reading apparatus, and, more particularly, to an image reading apparatus including an automatic document feeder (ADF) by which an image is read while a document is moved.

2. Description of the Related Art

Generally, an image reading apparatus reads an image printed on a document by scanning light onto the document and converting an optical signal generated from that light into an electric signal. Scanners, facsimiles, and multi-functional printers are examples of image reading apparatuses.

The image reading apparatuses include a scanning module for reading a document. The scanning module scans light onto a document to read the visible image printed on the document, converts an optical signal reflected from the document into an electrical signal, and transmits the electrical signal to a signal process module provided in the image reading apparatus.

Generally, either the scanning module or the document is moved. An image reading apparatus in which the scanning module is moved is referred to as a flat-bed type image reading apparatus. An image reading apparatus in which the document is moved is referred to as a sheet-feed type image reading apparatus. In addition, a flat-bed type image reading apparatus including an auto document feeder (ADF) is referred to as a hybrid type image reading apparatus.

The image reading apparatus includes a flat glass plane on which a document is placed and a scanning module that is disposed below the flat glass plane. The scanning module includes an optical scanning unit to scan light onto the document and an image sensor to convert an optical signal obtained by the reading of the document into an electric signal.

The optical scanning unit includes a light source that scans light from the rear surface of the flat glass plane onto the document. The light source may be a halogen lamp placed along a main scanning direction of the document. Hereinafter, a sub scanning direction indicates the direction in which a document is moved and the main scanning direction indicates the direction perpendicular to the sub-scanning direction.

The image sensor unit includes an image sensor such as a charge-coupled device (CCD) sensor or a contact image sensor (CIS) and a control board to control the operation of the image sensor.

An ADF is placed on the flat glass to move the document. The scanning module that is disposed on the rear surface of the flat glass reads an image from the document. In a mono-color image reading apparatus, the scanning module reads an image of a document based on the difference between the amounts of the light scanned and reflected from the document. The more the amount of the reflected light, the whiter the image read from the document is perceived.

Hereinafter, a margin of a document refers to the area that extends beyond the width of the document. When the width of the document is smaller in the sub-scanning direction than the length of the scanning module, the margin of the document is read as being black. This is because the light scanned onto the margin of the document is not reflected to the image sensor and instead diverges around the image sensor. A contact member is formed to prevent this effect. The contact member is elastically biased by elastic members and presses the document to closely adhere to the flat glass. In order to uniformly press the document, the elastic members should be placed at regular intervals in the main scanning direction, and the elasticity coefficient, length, and outer circumference of each of the elastic members must be substantially equal to each other. Thus, the assembly process of the image reading apparatus becomes complicated and the cost to control the quality of image scanning increases.

SUMMARY OF THE INVENTION

An aspect of the present invention provides an image reading apparatus including an auto document feeder (ADF) that has a plurality of elastic ribs to replace additional elastic members such that a contact member is formed of one component with the elastic ribs and is assembled easily and presses a document with a uniform elastic force without the need for an additional assembly process.

According to an aspect of the present invention, there is provided an image reading apparatus comprising: a scanning unit including a flat glass plane and a scanning module disposed on a rear surface of the flat glass plane to allow for a reading of a document in a main scanning direction; and an auto document feeder (ADF) that is disposed on an upper surface of the flat glass plane and which moves the document in a sub-scanning direction relative to the scanning unit, the sub-scanning direction being perpendicular to the main scanning direction, wherein the ADF includes: a contact member having a body unit that faces the scanning unit and biases the document toward the flat glass plane, and a plurality of elastic ribs that elastically bias the body unit toward the flat glass plane and which are integrally formed with the body unit.

The body unit may have an extended portion longer than the width of the document in a main scanning direction in order to read a margin of the document as white and the elastic ribs may elastically push the body unit including the extended portion toward the margin of the document.

The body unit may be elastically deformed according to the thickness of the document.

The plurality of elastic ribs may be separated apart from each other, and the magnitude of the elastic force of the elastic ribs may vary according to the number of the elastic ribs.

The elastic ribs may be separated a constant distance along the main scanning direction, and the elastic force may be substantially uniformly distributed along the main scanning direction.

The elastic ribs may be cantilever-shaped, bending along the main scanning direction, and one end of each of the elastic ribs may be coupled with a rear surface of the body unit.

The elastic ribs may be beam-shaped and both ends of each of the elastic ribs may be coupled with a rear surface of the body unit.

The contact member may be elastically inserted into fixing grooves of the ADF, and the contact member may further comprise fixing hooks protruding at both ends of the body unit.

The contact member may be formed of a synthetic resin having a predetermined elasticity in an injection molding process.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
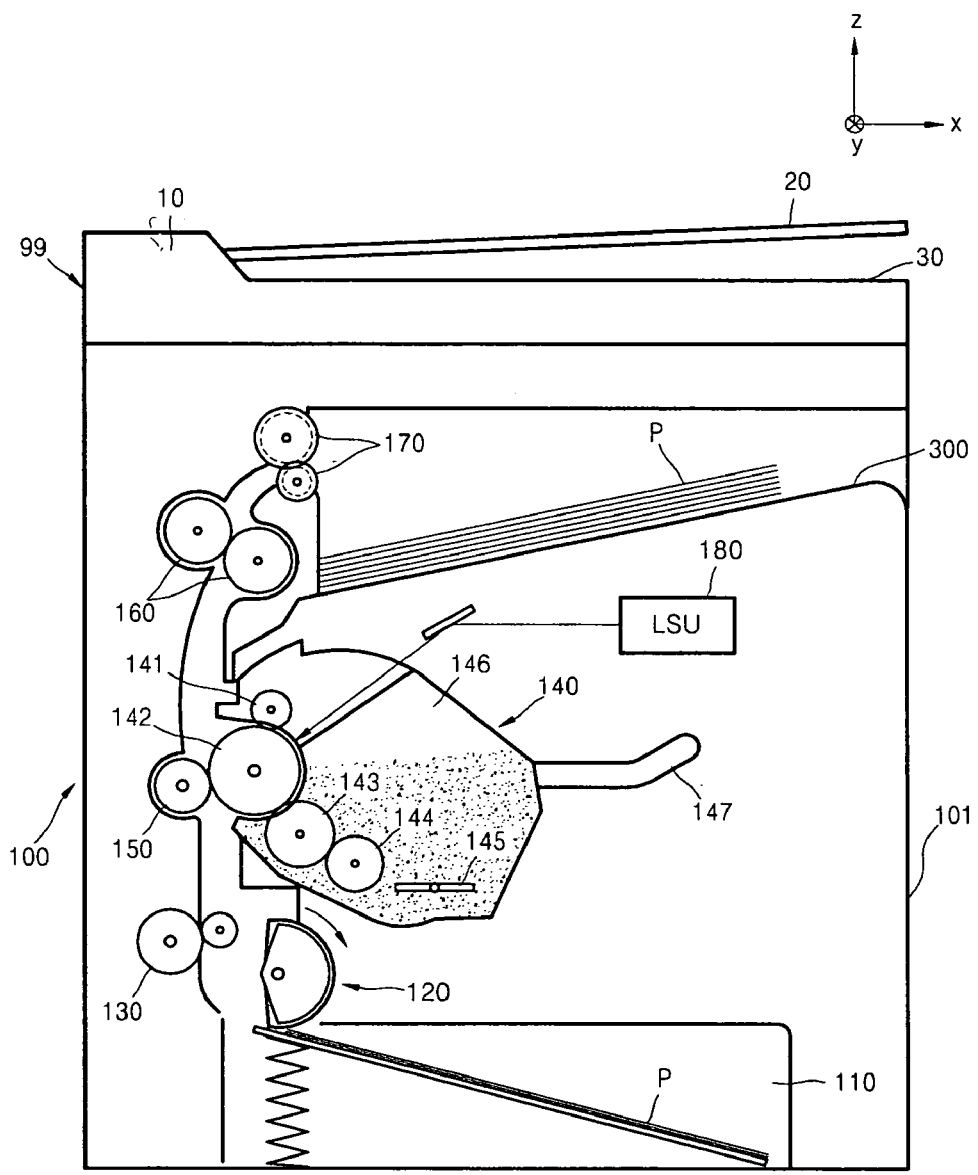
FIG. 1 is a lateral cross-sectional view of an image reading apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
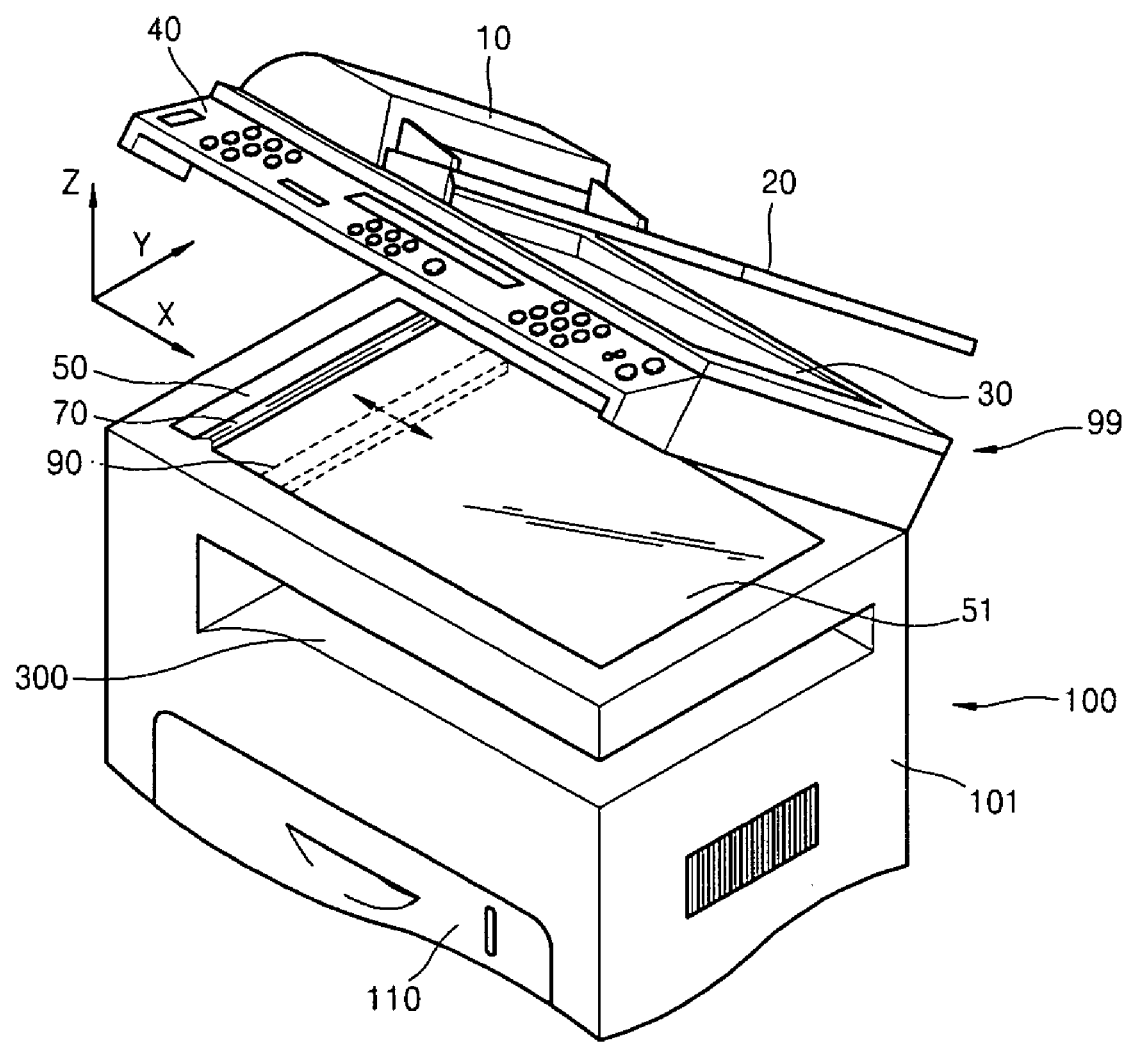
FIG. 2 is a perspective view of the image reading apparatus of FIG. 1.
Figure 3:
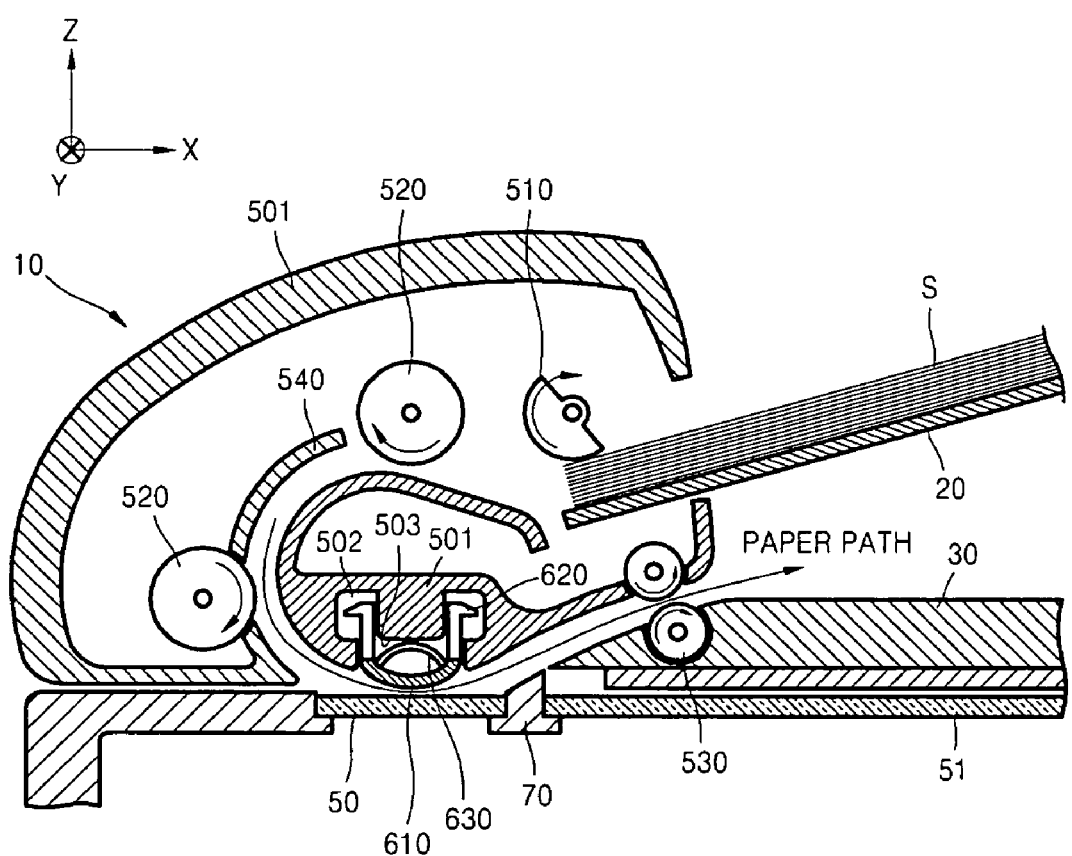
FIG. 3 is a lateral cross-sectional view of the image reading apparatus of FIG. 1.

FIG. 1 is a lateral cross-sectional view of an image reading apparatus according to an embodiment of the present invention; FIG. 2 is a perspective view of the image reading apparatus of FIG. 1; and FIG. 3 is a lateral cross-sectional view of the image reading apparatus of FIG. 1.

The image reading apparatus in FIGS. 1 and 2 is a multi-functional printer, according to an embodiment of the present invention, which is able to scan and print an image separately or at the same time. The image reading apparatus includes a printing unit 100 and a scanning unit 99. The printing unit 100 prints an image by employing an electro-photographic method. The scanning unit 99 is of a hybrid type of a scanning unit and includes an auto document feeder (ADF) 10. The scanning unit 99 reads an image in either a flat-bed or a sheet-feed manner.

The printing unit 100 includes an optical scanning unit 180, a developing cartridge 140, a fixing unit 160, and a paper feeding cassette 110. The x-axis of FIGS. 1 and 2 represents a sub-scanning direction in which a recording medium P or a document S is discharged. The y-axis of FIGS. 1 and 2 represents a main scanning direction and is perpendicular to the sub-scanning direction. Though not illustrated in the drawings, the printing unit 100 prints an image by employing an inkjet method or a dye-sublimation method according to embodiments of the present invention.

The optical scanning unit 180 forms an electrostatic latent image on an outer circumference of a photosensitive body 142 by scanning light corresponding to image information onto the photosensitive body 142.

A developing cartridge 140 is detachably installed in a main body 101 of the printing unit 100. According to an embodiment of the present invention, the developing cartridge 140 includes a charging roller 141, a photosensitive body 142, a developing roller 143, a supplying roller 144, an agitator 145, and a toner storage body 146. The toner storage body 146 stores toner. The developing cartridge 140 may be replaced when the toner stored in the toner storage body 146 is completely consumed. During replacement, the developing cartridge 140 is installed in the main body 101 of the printing unit 100 via a pushing of a handle 147 in a negative direction of the x-axis and is separated from the main body 101 of the printing unit 100 via a pulling of the handle 147 in a positive direction of the x-axis.

The photosensitive body 142 is installed such that a portion of the outer circumference thereof is exposed and rotated in a predetermined direction. A photoconductive material layer coats the outer circumference of the photosensitive body 142 as a result of, for example, a deposition method. The photosensitive body 142 is charged with a predetermined potential by the charging roller 141 and an electrostatic latent image corresponding to the image to be printed is formed on the outer circumference of the photosensitive body 142 by the light emitted from the optical scanning unit 180.

Solid powder toner at first adheres to a surface of the developing roller 143 and then the toner, which is attracted to the photosensitive body 142 due to the charging thereof, and which is repelled by a developing bias voltage that is applied to the developing roller 143, is attached to the electrostatic latent image formed on the photosensitive body 142 to develop the electrostatic latent image into a toner image. The outer circumferences of the developing roller 143 and the photosensitive body 142 contact each other and form a developing nip at the contact points or the outer circumferences are separated apart from each other and form a developing gap therebetween. The developing nip or gap should be formed along the axis of the developing roller 143 or the axis of the photosensitive body 142 to have a predetermined size. The toner is then moved through the developing gap or nip.

The supplying roller 144 supplies toner to the developing roller 143. The agitator 145 agitates the toner so that the toner in the toner storage body 146 does not solidify and transports the toner to the supplying roller 144.

A transfer roller 150 faces the outer circumference of the photosensitive body 142 and a transfer bias voltage having an opposite polarity to that of the toner image is applied to the transfer roller 150 so that the toner image developed by the photosensitive body 142 is transferred to the recording medium P. The toner image is transferred to the recording medium P by an electrostatic force and by mechanical contact pressure between the photosensitive body 142 and the transfer roller 150.

The fixing unit 160 includes a heat roller (not shown) and a pressure roller (not shown) that face each other and which supply heat and pressure to the toner image transferred to the recording medium P to fix the toner image on the recording medium P by an application of the heat and pressure.

A discharging roller 170 discharges the recording medium P to an exterior of the printing unit 100 once printing is completed on one or both sides of the recording medium P.

The recording medium P, having been discharged to the exterior of the printing unit 100, is stacked in a discharging tray 300.

The moving path of the recording medium P through the image forming apparatus is as follows. The printing unit 100 includes a paper feeding cassette 110, in which the recording medium P is stored. A pick up roller 120 picks up and draws out each recording medium P stored in the paper feeding cassette 110 in a sheet by sheet sequence. A feed roller 130 transports the picked up recording medium P toward the developing cartridge 140. The recording medium P then passes between the photosensitive body 142 and the transfer roller 150 so that the toner image is transferred thereon. The toner image, having been transferred onto the recording medium P, is fixed thereon by an application of the heat and pressure of the fixing unit 160. Then, the recording medium P is discharged to the discharging tray 300 by the discharging roller 170.

Referring to FIGS. 2 and 3, the scanning unit 99 includes a scanning module 90 that scans light to read an image of a document S, flat glass planes 50 and 51 on which the document S to be scanned is placed, and an ADF 10 that automatically feeds recording media to be scanned. The x-axis direction of FIGS. 1, 2 and 3 represents a sub-scanning direction in which the scanning module 90 moves when reading an image and the y-axis direction of FIGS. 1, 2 and 3 represents a main scanning direction in which the scanning module 90 reads an image of the document S.

The first flat glass plane 50 initially contacts a document S that is being transported by the ADF 10 and the document S is laid still on a second flat glass plane 51. The first and second flat glass planes 50 and 51 are separated from each other. A document guide member 70 is formed between the ends of the first and second flat glass planes 50 and 51 to guide the document S from the first glass plane 50 to the second glass plane 51. A display panel 40 displays the operational state of the printing unit 100 and the scanning unit 99 and includes several kinds of operation keys.

A document S, stacked on a feeding plate 20, is transported to the first glass plane 50 by the ADF 10. The scanning module 90, which is stopped on a rear surface of the first flat glass plane 50, reads the image recorded on the document S. The read document S is then discharged to a discharging plate 30.

When the document S is supplied separately from other documents and not automatically by the ADF 10, the document S is placed by a user on an upper surface of the second flat glass plane 51. The scanning module 90 is then moved on the rear surface of the second flat glass plane 51 in the sub-scanning direction and reads the image of the stopped document S. When the scanning module 90 is disposed on the rear surface of the first flat glass plane 50, the scanning module 90 reads the document S that is transported by the ADF 10, and when the scanning module 90 is disposed on the rear surface of the second flat glass plane 51, the scanning module 90 reads the stopped document S. The scanning unit 99 is not limited to the above construction and may be constructed in various ways.

The ADF 10 includes a transporting unit (not shown) and a contact member 600. The transporting unit includes a first roller 510, a second roller 520, a third roller 530, and a guide 540. The first roller 510 picks up the document S from the top of the stack of documents S stacked on the feeding plate 20 in a sheet by sheet sequence. At least one second roller 520 is used to transport the document S picked up by the first roller 510 to an upper surface of the first flat glass plane 50. (Hereinafter, the first flat glass plane 50 is referred to as a flat glass plane 50.) The scanning module 90 reads the document S transported to the upper surface of the flat glass plane 50, and the third roller 530 discharges the read document S to the discharging plate 30. A guide 540 guides the document S along this path.

FIGS. 4A through 6 illustrate the contact member 600 according to various embodiments of the present invention. Referring to FIGS. 3 through 6, the contact member 600 includes a body unit 610 and elastic ribs 630a, 630b, and 630c.

The body unit 610 biases the document S to closely contact the upper surface of the flat glass plane 50 due to the elasticity of the elastic ribs 630a, 630b, and 630c. In order to read the margin of the document S as white, a rear surface of the body unit 610 contacting the document S is white, and the body unit 610 is extended to be longer than the maximum width of the readable document S. To this end, a white sticker may be attached on the rear surface of the body unit 610 contacting the document S.

Further, if the image reading apparatus is to be required to be able to read a document having a maximum A3 size, the length of the body unit 610 in the main scanning direction should be at least long and/or large enough to extend beyond the edges of A3 size paper.

The body unit 610 may be elastically deformed according to the width of the document S in the main scanning direction. If the body unit 610 is rigid, a thick document S would not reliably contact the flat glass plane 50 and might even come off the flat glass plane 50 along a z-axis direction of FIGS. 1, 2 and 3. If a gap between the flat glass plane 50 and the body unit 610 increases, the margin of the document S may be read as gray or black. To prevent this, the body unit 610 may be formed of a material having a predetermined elasticity. Accordingly, the body unit 610 may be bent along the y-axis, thus forming a z-axis step between a portion contacting the document S and a portion covering the margin of the document S. The more the portion of the body unit 610 covering the margin of the document S contacts a larger area of the flat glass plane 50, the more light is easily reflected. Thus, a white image may be more effectively read.

According to an embodiment of the invention, the elastic ribs 630a, 630b, and 630c are formed integrally with the body unit 610 and elastically bias the body unit 610 toward the document S and the flat glass plane 50. The contact member 600 includes the body unit 610 and the elastic ribs 630a, 630b, and 630c that are formed as one unit. As shown in FIG. 3, when a contact member 600 is assembled in the ADF 10, fixing hooks 620 protruding at both ends of the body unit 610 may be elastically inserted into fixing grooves 502 formed in the ADF 10.

After being inserted into the fixing grooves 502, the fixing hooks 620 may be moved within the height of the fixing grooves 502 in the z-axis direction. Accordingly, when the body unit 610 and the elastic ribs 630a, 630b, and 630c are elastically deformed, the fixing hooks 620 are prevented from contacting and entering into the fixing grooves 502 in the z-axis direction. As the fixing hooks 620 protrude in the z-axis direction and generate an elastic force in the x-axis direction, they are elastically inserted into the fixing grooves 502. Since an end of each of the fixing hooks 620 is bent in the x-axis direction, once the fixing hooks 620 are inserted into the fixing grooves 502, the fixing hooks 620 are not easily separated from the fixing grooves 502.

Unlike the elastic member that is formed separately in the case of the conventional image reading apparatus, in the present embodiment, the properties of the elastic ribs 630a, 630b, and 630c may be controlled uniformly. Thus, the assembling processes and the assembling costs of the contact member 600 may be reduced.

According to an embodiment of the present invention, the contact member 600 may be formed of synthetic resin having a predetermined elasticity. The elastic ribs 630a, 630b, and 630c may be formed of the same material as the body unit 610 during the same injection molding process. The elastic ribs 630a, 630b, and 630c may be formed in various shapes and in different positions with respect to the body unit 610. The illustrated elastic ribs 630a, 630b, and 630c are only an example and the present invention is not limited thereto.

Figure 4A:
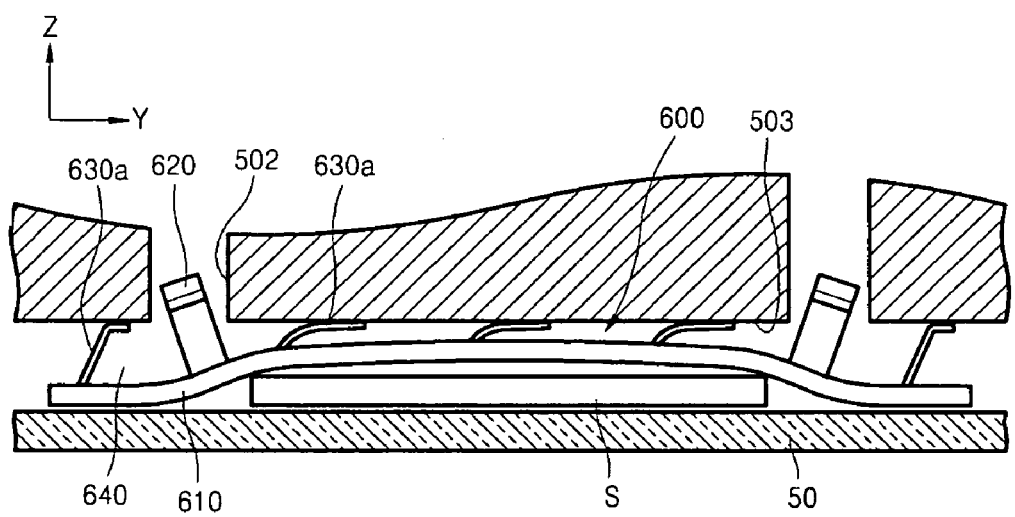
FIG. 4A is a cross-sectional view of a contact member in the image apparatus of FIG. 1 according to an embodiment of the present invention.
Figure 4B:
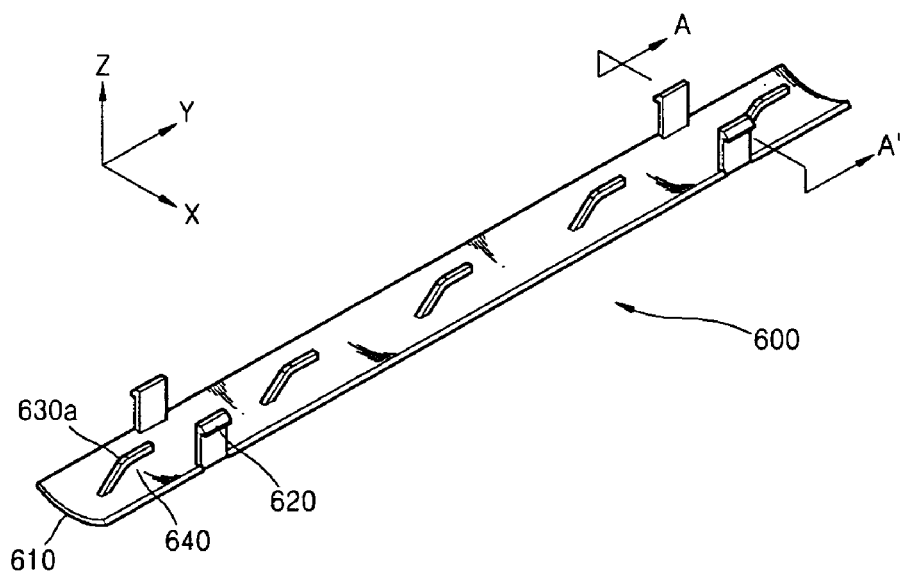
FIG. 4B is a perspective view of the contact member of FIG. 4A.
Figure 4C:
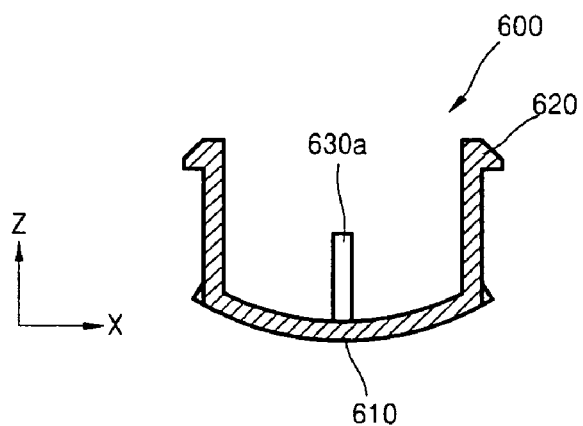
FIG. 4C is a cross-sectional view along line A-A' of FIG. 4B.

The contact member 600 illustrated in FIGS. 4A through 4C includes a cantilever-shaped elastic rib 630a. FIG. 4A shows a cross-sectional view of the contact member 600 in the image apparatus of FIG. 1 according to an embodiment of the present invention; FIG. 4B is a perspective view of the contact member 600 of FIG. 4A; and FIG. 4C is a cross-sectional view along line A-A' of FIG. 4B. A first end of the elastic rib 630a contacts the rear surface of the body unit 610 and a second end of the elastic rib 630a contacts a control unit 503 formed in a main body 502 of the ADF. If the body unit 610 contacts the document S or the flat glass plane 50, the elastic rib 630a is bent in the y-axis direction, thereby elastically biasing the body unit 610. A space 640 is formed between the rear surface of the elastic rib 630a and the upper surface of the body unit 610. The elastic rib 630a is elastically deformed in the space 640. During the injection molding process of the contact member 600, the core of the mold is thus separated toward the x-axis. Thus, the contact member 600 may be easily mass-produced.

Figure 5A:
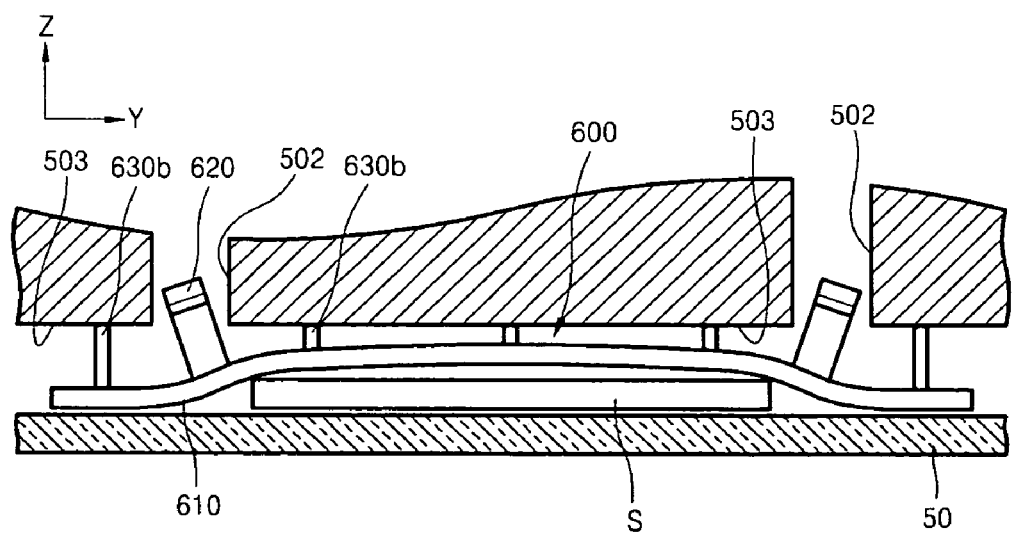
FIG. 5A is a perspective view of a contact member in the image apparatus of FIG. 1 according to another embodiment of the present invention.
Figure 5B:
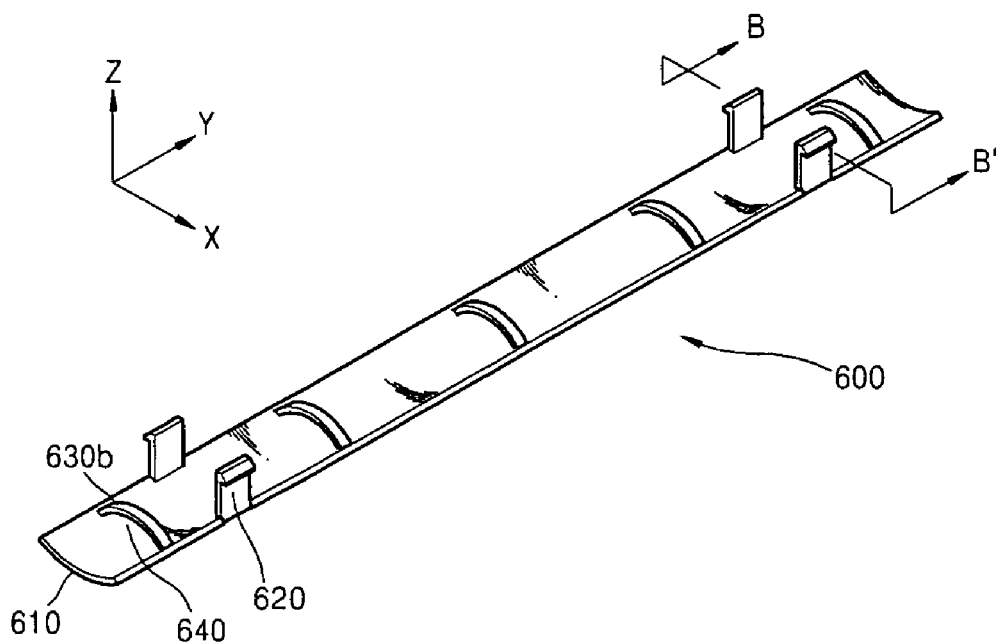
FIG. 5B is a perspective view of the contact member of FIG. 5A.
Figure 5C:
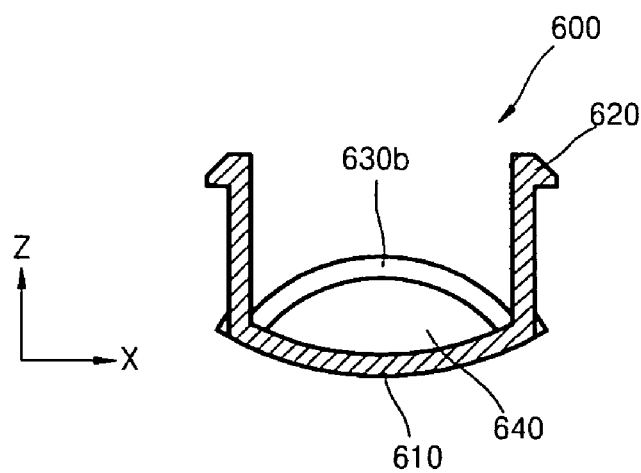
FIG. 5C is a cross-sectional view cut along a line B-B' of FIG. 5B.

The contact member 600 in FIGS. 5A through 5C includes an elastic rib 630b that is shaped as a double ended supporting beam. FIG. 5A is a perspective view of the contact member 600 in the image apparatus of FIG. 1 according to another embodiment of the present invention; FIG. 5B is a perspective view of the contact member 600 of FIG. 5A; and FIG. 5C is a cross-sectional view cut along a line B-B' of FIG. 5B. Both ends of the elastic rib 630b are connected to both sides of the body unit 610 in the x-axis direction. The center of the elastic rib 630b contacts a regulation unit 503 formed in the main body of the ADF 10. When the body unit 610 contacts the document S or the flat glass plane 50, the elastic rib 630b is bent in the x-axis direction, thereby elastically biasing the body unit 610 in the x-axis direction. The elastic rib 630b is elastically bent in the space 640. During the injection molding process of the contact member 600, the core of the mold is thus separated toward the x-axis. Thus, the contact member 600 may be easily mass-produced.

Figure 6:
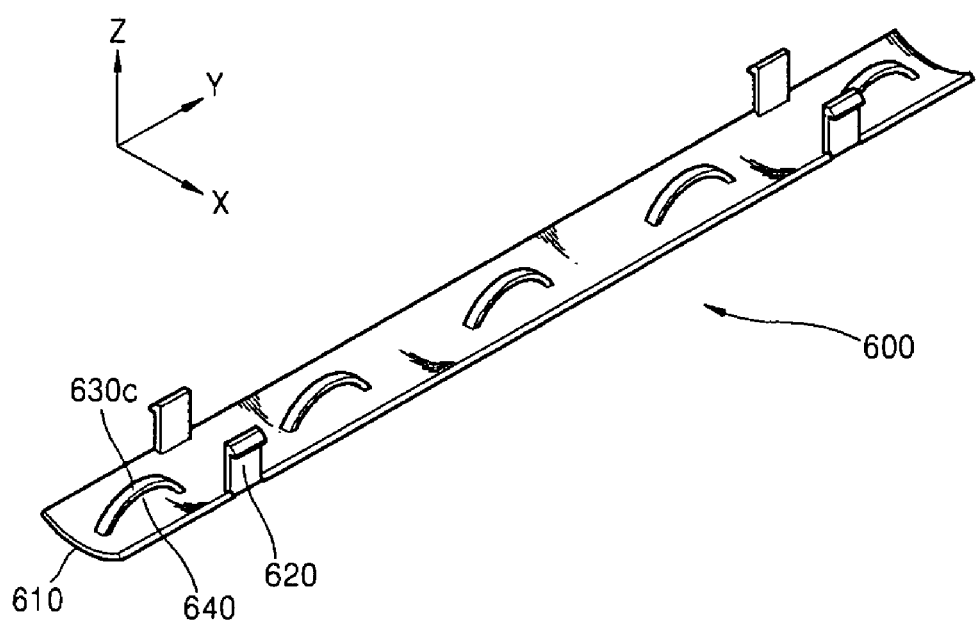
FIG. 6 is a perspective view of a contact member according to another embodiment of the present invention.

The contact member 600 illustrated in FIG. 6 also includes an elastic rib 630c that is shaped as a double ended supporting beam. Both ends of the elastic rib 630c are connected onto a rear surface of the body unit 610 in the y-axis direction. When the body unit 610 contacts the document S or the flat glass plane 50, the elastic rib 630c is bent in the y-axis direction, thereby elastically biasing the body unit 610. During the injection molding process of the contact member 600, the core of the mold is thus separated toward the x-axis. Thus, the contact member 600 may be easily mass-produced.

The description hereinafter is made with reference to FIGS. 3 through 6. The elastic ribs 630a, 630b, and 630c elastically bias the body unit 610 covering the document S to closely adhere the document S to the flat glass plane 50. Also, the elastic ribs 630a, 630b, and 630c elastically bias an extended portion of the body unit 610 that contacts the margin of the document S to reduce the gap between the body unit 610 and the flat glass plane 50. A plurality of the elastic ribs 630a, 630b, and 630c are separated by a predetermined distance along the main scanning direction from each other. The elastic force which affects the body unit 610 is controlled according to the number of the elastic ribs 630a, 630b, and 630c. Since the elastic ribs 630a, 630b, and 630c are formed at a regular interval along the main scanning direction, the elastic force of the ribs 630a, 630b, and 630c is uniformly distributed along the main scanning direction. Accordingly, a skewing of the document S is prevented.

As is described above, since the body unit 610 of the image reading apparatus includes, according to aspects of the present invention, the elastic ribs 630a, 630b, and 630c formed integrally with the body unit 610, the number of the manufacturing processes for the contact member 600 and the cost for controlling the quality thereof may be reduced. Since one contact member is provided, the contact member may be easily assembled in the ADF and biases the document S with a uniform elastic force, thereby preventing a reading malfunction of the image reading apparatus and making it possible to read the margin of a thick document as white.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image reading apparatus comprising:
a scanning unit including a flat glass plane and a scanning module disposed on a rear surface of the flat glass plane to allow for a reading of a document in a main scanning direction; and
an auto document feeder (ADF) that is disposed on an upper surface of the flat glass plane and which moves the document in a sub-scanning direction relative to the scanning unit, the sub-scanning direction being perpendicular to the main scanning direction, wherein the ADF includes:
a contact member having a body unit that faces the scanning module while interposing the flat glass plane therebetween and biases the document toward the flat glass plane, and
a plurality of elastic ribs that elastically bias the body unit toward the flat glass plane and which are integrally formed with the body unit.

2. The apparatus according to claim 1, wherein the body unit has an extended portion which is longer than the width of the document in a main scanning direction such that a margin around the document is read as being white.

3. The apparatus according to claim 2, wherein the elastic ribs elastically bias the body unit, including the extended portion, toward the flat glass plane at positions corresponding to the margin of the document.

4. The apparatus according to claim 3, wherein the body unit is elastically deformed according to the thickness of the document.

5. The apparatus according to claim 3, wherein the plurality of elastic ribs are separated from each other.

6. The apparatus according to claim 5, wherein a magnitude of the elastic force of the elastic ribs varies according to a number of the elastic ribs.

7. The apparatus according to claim 6, wherein the elastic ribs are separated a constant distance from each other along the main scanning direction, and the elastic force of the elastic ribs is substantially uniformly distributed along the main scanning direction.

8. The apparatus according to claim 7, wherein the elastic ribs are each cantilever-shaped, and bend along the main scanning direction with one end of each of the elastic ribs being coupled to a rear surface of the body unit.

9. The apparatus according to claim 7, wherein the elastic ribs are each beam-shaped with both ends of each of the elastic ribs being coupled to a rear surface of the body unit.

10. The apparatus according to claim 1, wherein the contact member is elastically inserted into fixing grooves of the ADF.

11. The apparatus according to claim 10, wherein the contact member comprises fixing hooks protruding from both ends of the body unit.

12. The apparatus according to claim 1, wherein the contact member comprises a synthetic resin having a predetermined elasticity, and is formed by an injection molding process.

13. An image reading and/or forming apparatus comprising:
- a flat glass plane disposed at a top surface of a main body of the apparatus on which a document to be read is placed;
- a body unit to lay upon the document and to bias the document toward the flat glass plane;
- a plurality of elastic ribs that bias the body unit to be deformed around margins of the and
- a scanning module disposed beneath the flat glass plane and inside the main body to scan light toward the document, the light being reflected by at least the entire surface of the document back to the scanning module such that the document is readable to the scanning module.

14. The apparatus according to claim 13, wherein the margins of the document comprise the surface area of the flat glass plane that is not covered by the document.

15. The apparatus according to claim 13, further comprising a scanning module disposed beneath the flat glass plane and inside the main body to scan light toward the document, the light being reflected by at least the entire surface of the document back to the scanning module such that the document is readable to the scanning module.

16. The apparatus according to claim 15, further comprising a feeding system to move either or both of the document and/or the scanning module with respect to the other in a first direction.

17. The apparatus according to claim 15, wherein the scanning module is larger than the document in a second direction, the second direction being perpendicular to the first direction.

18. The apparatus according to claim 13, wherein the body unit is deformed according to the thickness of the document.

19. The apparatus according to claim 13, wherein the plurality of elastic ribs are separated from each other.

20. The apparatus according to claim 19, wherein a magnitude of an elastic force generated by the elastic ribs varies according to a number of the elastic ribs.

21. The apparatus according to claim 20, wherein the elastic ribs are separated a constant distance from each other along the main scanning direction, and the elastic force of the elastic ribs is substantially uniformly distributed along the main scanning direction.

22. The apparatus according to claim 13, wherein the elastic ribs are each cantilever-shaped, and bend along the main scanning direction with one end of each of the elastic ribs being coupled to a rear surface of the body unit.

23. The apparatus according to claim 13, wherein the elastic ribs are each beam-shaped with both ends of each of the elastic ribs being coupled to a rear surface of the body unit.

* * * * *